(12) United States Patent
Valeri et al.

(10) Patent No.: US 9,388,776 B2
(45) Date of Patent: Jul. 12, 2016

(54) ENGINE SOUND ENHANCEMENT SYSTEM FOR A FIXED GEAR TRANSMISSION

(71) Applicant: GM GLOBAL TECHNOLOGY OPERATIONS LLC, Detroit, MI (US)

(72) Inventors: Frank C. Valeri, Novi, MI (US); Scott M. Reilly, Davisburg, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 177 days.

(21) Appl. No.: 13/663,834

(22) Filed: Oct. 30, 2012

(65) Prior Publication Data

US 2014/0121896 A1    May 1, 2014

(51) Int. Cl.
*B60Q 9/00* (2006.01)
*B60Q 5/00* (2006.01)
*F02M 35/12* (2006.01)

(52) U.S. Cl.
CPC ............ *F02M 35/1294* (2013.01); *B60Q 9/00* (2013.01); *B60Q 5/008* (2013.01); *G10K 2210/51* (2013.01); *H04R 2499/13* (2013.01)

(58) Field of Classification Search
CPC .................................. B60Q 5/00; B60Q 9/00
USPC ........................................................ 340/384.3
See application file for complete search history.

(56) References Cited

U.S. PATENT DOCUMENTS

| | | | | |
|---|---|---|---|---|
| 7,088,829 | B1 * | 8/2006 | Schick et al. | 381/71.4 |
| 8,542,844 | B2 * | 9/2013 | Bowden et al. | 381/71.4 |
| 8,620,001 | B2 * | 12/2013 | Peachey et al. | 381/61 |
| 2008/0152159 | A1 * | 6/2008 | Kassner | 381/71.5 |
| 2010/0208915 | A1 * | 8/2010 | Lipp | 381/86 |
| 2011/0010269 | A1 * | 1/2011 | Ballard | 705/26.41 |
| 2011/0085674 | A1 * | 4/2011 | Fujikawa | 381/86 |
| 2012/0257763 | A1 | 10/2012 | Bowden et al. | |

FOREIGN PATENT DOCUMENTS

| | | |
|---|---|---|
| CN | 201721384 U | 1/2011 |
| CN | 102044240 A | 5/2011 |
| CN | 102481927 A | 5/2012 |
| CN | 102562343 A | 7/2012 |

* cited by examiner

*Primary Examiner* — Todd Melton
(74) *Attorney, Agent, or Firm* — Cantor Colburn LLP

(57) ABSTRACT

A control system for a vehicle having a fixed gear transmission and an engine that outputs an actual RPM signal is provided. The control system includes a vehicle bus, a shifting module, a simulated RPM module, and an engine sound enhancement ("ESE") module. The vehicle bus transmits a signal indicating a plurality of operating conditions of the vehicle. The shifting module receives the signal from the vehicle bus to determine if the operating parameters of the vehicle indicate that a gear shift by the fixed gear transmission is imminent within a predetermined amount of time. The simulated RPM module is in communication with the shifting module for generating a simulated RPM signal if the gear shift is imminent. The simulated RPM signal has a greater increase in engine RPM with respect to time prior to the gear shift compared to the actual RPM signal.

18 Claims, 3 Drawing Sheets

ENGINE SOUND ENHANCEMENT SYSTEM FOR A FIXED GEAR TRANSMISSION

FIELD OF THE INVENTION

Exemplary embodiments of the invention relate to a control system for a vehicle and, more particularly, to a control system providing engine sound enhancement for a vehicle having a fixed gear transmission.

BACKGROUND

A powertrain having a fixed gear transmission may be tuned to generate relatively smooth shift points. A shift point is typically defined as when the fixed gear transmission shifts from a lower gear ratio to a higher gear ratio (e.g., shifting from second gear to third gear), or from a higher gear ratio to a lower gear ratio. Specifically, the powertrain may be tuned such that the engine increases in RPM relatively slowly or gradually when approaching a shift point. Increasing the engine RPM at a gradual rate reduces or substantially eliminates the level of harshness (e.g., jarring or jerking) that may be perceived by vehicle occupants during shifting of the fixed gear transmission.

One drawback of increasing the engine RPM gradually is that some individuals may perceive the engine as being underpowered or slow during shifting. However, if the fixed gear transmission is calibrated to shift more aggressively, this increases the level of harshness that may be perceived by the vehicle occupants. Accordingly, it is desirable to provide a fixed gear transmission having improved sound quality without increasing the level of harshness perceived by vehicle occupants during shifting.

SUMMARY OF THE INVENTION

In one exemplary embodiment of the invention, a control system for a vehicle having a fixed gear transmission and an engine that outputs an actual RPM signal is provided. The fixed gear transmission selectively performs a gear shift. The control system includes a vehicle bus, a shifting module, a simulated RPM module, and an engine sound enhancement ("ESE") module. The vehicle bus transmits a signal indicating a plurality of operating conditions of the vehicle. The shifting module receives the signal from the vehicle bus to determine if the operating parameters of the vehicle indicate that the gear shift by the fixed gear transmission is imminent within a predetermined amount of time. The simulated RPM module is in communication with the shifting module for generating a simulated RPM signal if the gear shift is imminent. The simulated RPM signal has a greater increase in engine RPM with respect to time prior to the gear shift compared to the actual RPM signal. The engine sound enhancement ("ESE") module receives the simulated RPM signal from the simulated RPM module and determines ESE tones based on the simulated RPM signal.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
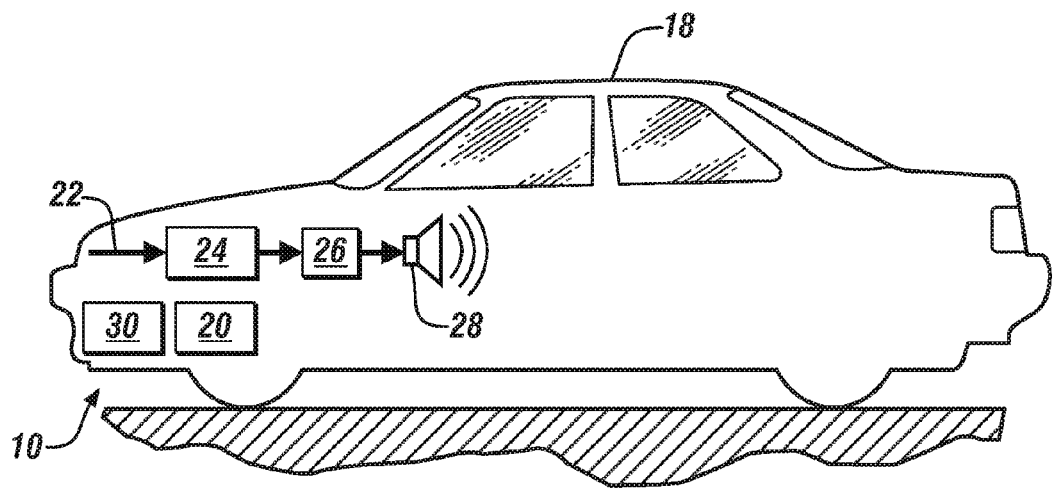
FIG. 1 is a schematic diagram of an exemplary control system in a vehicle.

Referring now to FIG. 1, an exemplary embodiment is directed to a control system 10 for providing engine sound enhancement for a vehicle 18. The control system 10 includes a fixed gear transmission 20, a vehicle bus 22, a control module 24, an amplifier 26, a transducer 28, and an engine 30. The control system 10 is configured for enhancing specific tones or sounds that are emitted by the engine 30 based on various operating parameters of the vehicle 18. The fixed gear transmission 20 is generally any type of transmission having a finite number of gear ratios (e.g., a six-speed automatic transmission). Specifically, the fixed gear transmission 20 may upshift from a lower gear ratio to a higher gear ratio (e.g., from second gear to third gear), or downshift from a higher gear ratio to a lower gear ratio (e.g., from third gear to second gear). The vehicle bus 22 is in communication with various control modules (not illustrated) of the vehicle 18.

The vehicle bus 22 transfers data between various vehicle control modules (not shown) indicating operating parameters of the vehicle 18. For example, the vehicle bus 22 may be in communication with an engine control module (not shown) of the engine 30 to receive a signal indicating engine speed, and engine torque. In another example, the vehicle bus 22 may also be in communication with a transmission control module (not shown) to receive a signal indicating a transmission state of the fixed gear transmission 20. The transmission state refers to a position of a shift lever (not shown) of the vehicle 18, such as a park "P" position, a reverse "R" position, or various drive positions (e.g., first gear, second gear, third gear, etc.). The vehicle bus 22 may also contain other operating parameters of the vehicle 18 as well such as, for example, vehicle speed, engine speed rate of change, vehicle acceleration, yaw rate, fore/aft acceleration, a vehicle selected mode, throttle pedal position, and throttle pedal rate of change (throttle not shown) as well.

The vehicle selected mode refers to a selectable driving mode of the vehicle 18. When selected, the vehicle selected mode will modify operation of various systems of the vehicle 18 such as, for example, a vehicle steering system (not shown), a vehicle suspension (not shown), a vehicle audio system (e.g., which includes the amplifier 26 and the transducer 28), and the fixed gear transmission 20. Some examples of vehicle selected modes include, but are not limited to, Race, Normal, Stealth, City, Sport (which in turn will include various levels of the Sport mode of the vehicle 18), and Economy. For example, in Economy mode various operating parameters of the vehicle 18 are modified to improve fuel economy. In another example, in Sport mode various operating parameters of the vehicle 18 are modified to enhance acceleration and overall vehicle performance. Some examples of vehicle systems that may be affected include, but are not limited to, a steering system, an exhaust system, a vehicle suspension (not illustrated), and the control system 10. The Sport mode may also include various levels of enhanced vehicle performance (which is sometimes referred to as sportiness) as well.

The control module 24 is in operable communication with the vehicle bus 22 and the amplifier 26. The amplifier 26 receives a control signal from the control module 24. The amplifier 26 converts the control signal to an electrical signal that is used to drive the transducer 28. Although FIG. 1 illustrates the control module 24 and the amplifier 26 as separate components, it is understood that the control module 24 and the amplifier 26 may be integrated into a single unit as well. In one exemplary approach, the transducer 28 is a speaker that is configured for emitting an audio signal that combines or blends with the tones that are emitted from the engine 30, an exhaust gas system (not illustrated), and an air induction system (not shown) of the vehicle 18. In one exemplary embodiment, the transducer 28 may be part of an infotainment system of the vehicle 18.

Figure 2:
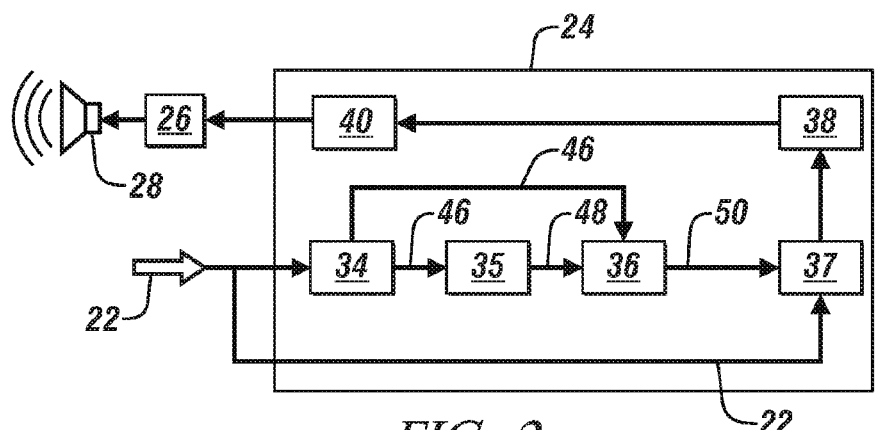
FIG. 2 is a dataflow diagram of a control module shown in FIG. 1.

Referring now to FIG. 2, a dataflow diagram illustrates an exemplary embodiment of the control module 24 of FIG. 1. In various embodiments, the control module 24 may include one or more sub-modules and datastores. As used herein the terms module and sub-module refer to an application specific integrated circuit (ASIC), an electronic circuit, a processor (shared, dedicated, or group) and memory that executes one or more software or firmware programs, or a combinational logic circuit. As can be appreciated, the sub-modules shown in FIG. 2 can be combined and/or further partitioned.

In the exemplary embodiment as shown in FIG. 2, the control module 24 includes a shift determination module 34, a powerful driving condition module 35, a simulated RPM module 36, a shift point determination module 37, and an engine sound enhancement ("ESE") module 38. The shift determination module 34 receives a data signal as input from the vehicle bus 22. The data signal indicates a plurality of operating parameters of the vehicle 18 (FIG. 1). The control module 24 also includes a memory 40. The shift determination module 34 includes control logic for determining if the operating parameters received from the vehicle bus 22 indicate that a gear shift by the fixed gear transmission 20 is imminent within a predetermined amount of time. That is, the shift determination module 34 determines if the fixed gear transmission 20 will shift gears within the predetermined amount of time if the operating parameters of the vehicle 18 remain generally constant. The shift determination module 34 monitors the operating parameters received from the vehicle bus 22 to determine if a gear shift is imminent or about to occur. If the shift determination module 34 determines that a gear shift is imminent (e.g., the gear shift will occur within the predetermined amount of time), then the shift determination module 34 generates a shift signal 46. However, as discussed below, the operating parameters of the vehicle 18 may change, and the gear shift may no longer be imminent (e.g., a driver removes his or her foot from an accelerator pedal), and is determined by the shift point determination module 37.

In one exemplary embodiment, the shifting module 34 includes logic to determine if a gear shift of the fixed gear transmission 20 will occur within the predetermined amount of time based on at least the engine speed and engine torque. In one embodiment, the shifting module 34 may also determine if the fixed gear transmission 20 will shift gears based on an additional number of operating parameters as well. Specifically, for example, the additional operating parameters may include, but are not limited to, the vehicle speed, engine speed rate of change, vehicle acceleration, transmission state, yaw rate, fore/aft acceleration, vehicle selected mode, throttle pedal position, and throttle pedal rate of change (throttle not shown) as well.

In one embodiment, the powerful driving condition module 35 may determine if the operating parameters of the vehicle 18 (e.g., the throttle pedal position, throttle pedal rate of change, vehicle acceleration, engine speed rate of change, and/or the activation of a vehicle selected mode such as Sport mode) indicate an aggressive or powerful driving condition. The powerful driving condition module 35 receives as input the shift signal 46 and the plurality of operating parameters of the vehicle 18 (FIG. 1) from the shifting determination module 34. The powerful driving condition module 35 provides a powerful shift signal 48. Some examples of the aggressive or powerful driving include, but are not limited to, a relatively rapid acceleration of the vehicle 18 from a stoplight, or passing another vehicle on a two-lane road. These types of aggressive or powerful driving conditions indicate an enhanced emotional state of a driver, where the driving experience of the driver and vehicle occupants would be enhanced by a shifting sound. The powerful driving condition usually indicates that a driver would expect to hear a more pronounced shifting sound.

Figure 3:
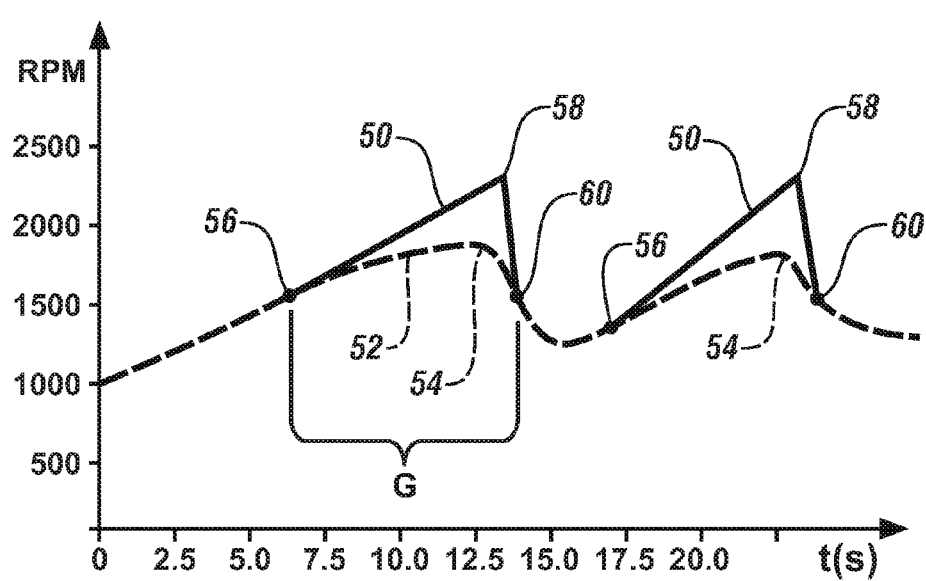
FIG. 3 is an illustration of an exemplary graph illustrating a simulated RPM signal generated by the control module shown in FIG. 2 and an RPM profile generated by operation of an engine shown in FIG. 1.

The simulated RPM module 36 is in communication with the shift determination module 34 and the powerful driving condition module 35. The simulated RPM module 36 receives as input either the shift signal 46 from the shift determination module 34, or the powerful shift signal 48 from the powerful driving condition module 35. If the shift signal 46 is sent to the simulated RPM module 36, then the simulated RPM module 36 generates an enhanced or simulated RPM signal 50, which is further illustrated in FIG. 3. Turning now to FIG. 3, the simulated RPM signal 50 generated by the simulated RPM module 36 has a greater increase in RPM with respect to time during a gear shift time interval G when compared to an actual RPM signal 52 generated by operation of the engine 30 (shown in FIG. 1) prior to the fixed gear transmission 20 shifting gears (indicated by a shift point 54). The shift points 54 define when the fixed gear transmission 20 actually shifts gears.

In the embodiment as shown in FIG. 3, the engine 30 may be tuned to generate a relatively smooth RPM profile during the gear shift time interval G, which in turn reduces the jarring or jerking sensation experienced by vehicle occupants as the fixed gear transmission 20 shifts. Specifically, the engine 30 is tuned or calibrated to generate a relatively slower rate of increase in RPM when approaching one of the shift points 54. For example, FIG. 3 illustrates a generally curved actual RPM signal 52 when approaching one of the shift points 54. In contrast, the simulated RPM signal 50 generated by the simulated RPM module 36 increases at a predetermined rate that is different than the actual RPM rate. Specifically, the simulated RPM signal 50 increases at a generally linear rate when approaching one of the shift points 54. It should be noted that while FIG. 3 illustrates the simulated RPM signal 50 increasing at a generally linear rate, the simulated RPM signal 50 may increase in RPM with a non-linear rate as well, including a generally convex profile (shown in FIG. 4) or a generally concave profile as well (not illustrated). In one exemplary approach, the simulated RPM signal 50 may also increase in RPM at an exponential rate as well when approaching one of the shift points 54.

The simulated RPM signal 50 and the actual RPM signal 52 bifurcate at point 56. Point 56 represents where the simulated RPM signal 50 increases at a greater rate when compared to the actual RPM signal 52 during the gear shift event G. The simulated RPM signal 50 may also include a simulated shift point 58. The simulated shift point 58 represents where the fixed gear transmission 20 would theoretically shift gears based on the simulated RPM signal 50. As seen in FIG. 3, the simulated shift point 58 is located at a higher simulated RPM than the shift point 54.

After the fixed gear transmission 20 shifts gears, the engine 30 (shown in FIG. 1) gradually decreases in RPM. In the embodiment as shown in FIG. 3, the engine 30 gradually ramps down and decreases in RPM after the fixed gear transmission 20 has shifted gear ratios. For example, FIG. 3 illustrates a generally curved actual RPM signal 52 after the fixed gear transmission 20 has shifted gears (e.g., after the shift simulated point 58). In contrast, the simulated RPM signal 50 decreases in RPM at a greater rate with respect to time after the fixed gear transmission 20 has shifted (e.g., after the shift point 54) when compared to the actual RPM signal 52 generated by operation of the engine 30 (shown in FIG. 1). For example, in the embodiment as shown in FIG. 3, the simulated RPM signal 50 drops in RPM at a generally constant linear rate, until reaching a point 60. The point 60 represents the time at which the simulated RPM signal 50 and the actual RPM signal 52 converge together. It should be noted that while FIG. 3 illustrates the simulated RPM signal 50 decreasing at a generally constant linear rate, the simulated RPM signal 50 may also decrease at various non-linear rates as well (e.g., to create a generally convex or concave profile).

Figure 4:
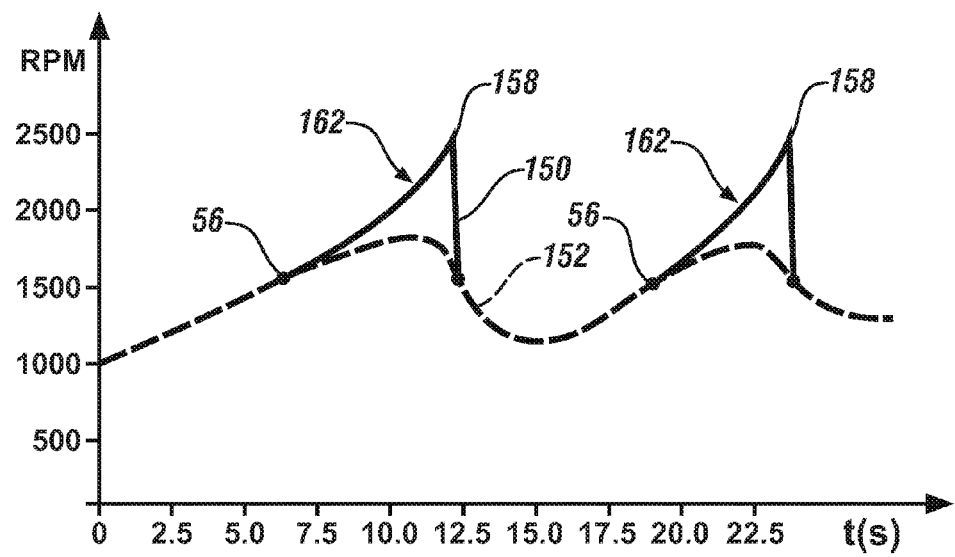
FIG. 4 is an alternative embodiment of the graph shown in FIG. 3 during a powerful driving condition.

FIG. 4 is an illustration of a simulated RPM signal 150 generated by the simulated RPM module 36 and an actual RPM signal 152, where the powerful driving condition module 35 has sent the powerful shift signal 48. Specifically, in the embodiment as shown in FIG. 4, the simulated RPM signal 150 increases at to create a concave profile 162. The simulated RPM signal 150 increases at a greater rate when approaching a simulated shift point 158 when compared to the simulated RPM signal 50 shown in FIG. 3. That is, the simulated RPM signal 150 increases at a significantly higher rate compared to the simulated RPM signal 50 (FIG. 3), due to the powerful driving condition. In one exemplary embodiment, the simulated RPM signal 150 may increase at an exponential rate.

Turning back to FIG. 2, the simulated RPM module 36 is in operable communication with the shift point determination module 37. The simulated RPM module 36 sends the simulated RPM signal 50 (or the simulated RPM signal 150 if the powerful driving condition is indicated) to the shift point determination module 37. The shift point determination module 37 also receives as input the operating parameters received from the vehicle bus 22, and determines if a gear shift by the fixed gear transmission 20 (FIG. 1) has actually occurred. For example, sometimes a driver may modify the operating parameters of the vehicle 18 after the shift signal has been sent from the shift determination module 34, but before the fixed gear transmission 20 actually performs the gear shift. For example, a driver may remove his or her foot from an accelerator pedal (not shown), and therefore a gear shift by the fixed gear transmission 20 will no longer happen. If the gear shift by the fixed gear transmission 20 has actually occurred, then the shift point determination module 37 sends either the simulated RPM signal 50 or the simulated RPM signal 150 to the ESE module 38. However, in the event that the shift point determination module 37 determines that a gear shift by the fixed gear transmission 20 will not occur, then the shift point determination module 37 determines a modified RPM signal 66, which is illustrated in FIG. 5.

Figure 5:
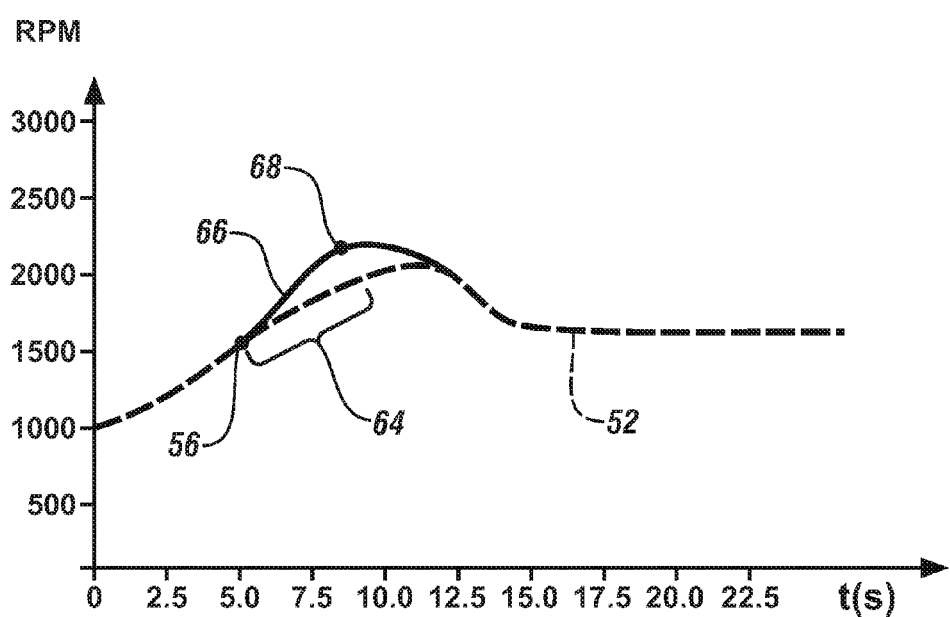
FIG. 5 is an illustration of a modified RPM signal and the RPM profile generated by operation of the engine.

FIG. 5 is an illustration of the actual RPM signal 52 where the engine 30 operates leading up to an imminent gear shift 64, however the fixed gear transmission 20 (FIG. 1) does not actually shift gears (e.g., a driver removes his or her foot from the accelerator pedal). The shift point determination module 37 determines the profile or shape of the modified RPM signal 66. The modified RPM signal 66 converges back with the actual RPM signal 52 generated by operation of the engine 30 (shown in FIG. 1). Specifically, for example, as seen in FIG. 5, the shift point determination module 37 determines at point 68 that a gear shift by the fixed gear transmission 20 will not occur. Accordingly, the shift point determination module 37 determines a downwardly sloping profile of the modified RPM signal 66 that decreases at an increasing rate to gradually converge with the actual RPM signal 52.

Turning back to FIG. 2, the ESE module 38 receives as input the simulated RPM signal 50, the simulated RPM signal 150, or the modified RPM signal 66 from the shift point determination module 37. The ESE module 38 also receives as input a plurality of engine order equations from the memory 40 of the control module 24. The engine order equations each correspond to a rotational frequency of a crankshaft (not shown) of the engine 30 (shown in FIG. 1). The engine order equations may be unique to a specific powertrain as well as the type of vehicle (e.g., sporty car, midsize sedan, etc.). Specifically, in one exemplary embodiment, the engine order equations may depend on the number of cylinders of the engine 30, engine displacement, engine aspiration (e.g., normally aspirated versus forced induction), engine calibration, vehicle selected mode, or an exhaust gas system (not shown) of the vehicle 18. Each engine order produces a specific frequency tone.

The ESE module 38 includes logic for determining specific ESE tones that are needed to emulate or mimic the sounds created by the engine related to the simulated RPM signals 50 or 150 (shown in FIGS. 3-4) generated by the simulated RPM module 36 (or the modified RPM signal 66 if the fixed gear transmission 20 does not shift). In particular, the ESE module 38 determines the type, frequency, and duration of ESE tones that are required to emulate the simulated RPM signal 50, 150. The ESE module 38 is in operable communication with the memory 40 of the control module 24, and selects pre-programmed shift tones stored in the memory 40. Specifically, the ESE module 38 selects specific pre-programmed shift tones based on the specific ESE tones that are needed to emulate the sound of the engine with respect to the simulated RPM signal 50 (shown in FIG. 3), the simulated RPM signal 150 (shown in FIG. 4), or the modified RPM signal 66 (shown in FIG. 5).

Figure 6:
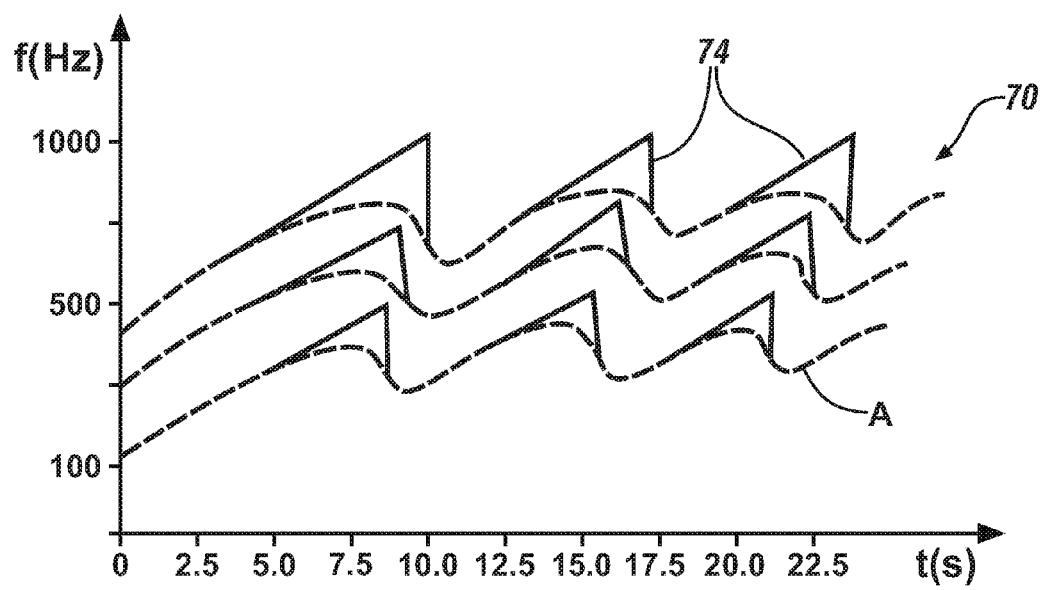
FIG. 6 is an illustration of an exemplary sound graph illustrating operation of the control system shown in FIG. 1.

The pre-programmed shift tones are sent from memory to the amplifier 26. The amplifier 26 converts the pre-programmed shift tones to an electrical signal that is used to drive the transducer 28. In one approach, the transducer 28 is a speaker that emits an audio signal that combines with the sound emitted from the engine 30 (FIG. 1). Specifically, the audio signal emitted from the speaker is blended with the sound emitted from the engine 30, and creates the sound of the simulated RPM signal 50. For example, referring to FIG. 6, an exemplary sound graph is illustrated during operation of the vehicle 18, where the fixed gear transmission 20 is shifting gears (shown in FIG. 1). The x-axis represents time (in seconds) and the y-axis represents frequency (in Hertz). A plurality of engine orders 70 are illustrated. Specifically, in the example as shown, the sound graph illustrates engine orders 70, where each engine order 70 includes a sound that is naturally emitted from the engine 30 (e.g., the sound the engine emits during operation of the vehicle 18) and ESE tones 74 emitted from the transducer 28. With reference to both FIGS. 2 and 6, at least one of the engine orders 70 is enhanced or actuated with the ESE tones 74, thereby creating the sound of the simulated RPM signal 50 (shown in FIG. 3). The ESE module 38 selects a plurality of ESE tones 74 that are superimposed on the engine orders 70. The ESE tones 74 emulate the RPM signal 50 shown in FIG. 3 (or the RPM signal 150 shown in FIG. 4 depending on operating conditions). As seen in FIG. 6, the size and shape of the ESE tones 74 may vary depending on the engine order and each RPM shift point (e.g., first gear shift point, second gear shift point, etc.).

The ESE module 38 may also augment a base order of the sound emitted by the engine as well. Specifically, a base order A is created naturally by the engine 30 (FIG. 1). In order to allow for blending of the ESE tones 74 generated by the ESE module 38 (FIG. 2), the base order A created by the engine 30 may be decreased. This in turn allows for the ESE tones 74 that emulate the shifting sound to stand out more cleanly from the base order sound. In one approach, active noise control ("ANC") may be used to cancel base orders.

Referring now to FIGS. 2-6, the ESE tones 74 have a greater increase in frequency prior to shifting on the fixed gear transmission 20 when compared to the sound that is emitted by the engine 30 (e.g., the engine orders 70). Specifically, the ESE tones 74 emulate an increase in RPM at a greater rate when compared to the sound emitted from the engine 30, and also emulate a decrease in RPM at a greater rate with respect to time after the fixed gear transmission 20 has shifted. Some individuals tend to interpret the sound emitted by the engine 30 as underpowered or weak as the fixed gear transmission 20 shifts. The ESE tones 74 provide a more crisp or defined shifting sound that is heard by occupants of the vehicle 18 during shifting of the fixed gear transmission 20 when compared to the sound emitted by the engine 30. The more defined, crisper sound may give the impression of a more powerful engine 30 to the vehicle occupants as the vehicle 18 shifts gears. Thus, the control system 10 as described above provides enhanced sound quality to the occupants of an interior cabin of the vehicle 18. At the same time, the control system 10 does not increase or modify the level of sound that is emitted from the vehicle 18 into the external environment.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A control system for a vehicle, the vehicle having a fixed gear transmission and an engine that outputs an actual RPM signal, the fixed gear transmission configured for selectively performing a gear shift, comprising:
    a vehicle bus transmitting a signal indicating a plurality of operating parameters of the vehicle;
    a computer processing device communicatively coupled to the vehicle bus;
    a shifting module executable by the computer processing device, the shifting module receiving the signal from the vehicle bus and determining if the plurality of operating parameters of the vehicle indicate that the gear shift by the fixed gear transmission is imminent within a predetermined amount of time, the gear shift determined to be imminent within the predetermined amount of time as a function of the operating parameters, the operating parameters including a combination of an engine speed and an engine torque;
    a simulated RPM module executable by the computer processing device, the simulated RPM module in communication with the shifting module for generating a simulated RPM signal upon determining the gear shift is imminent, wherein the simulated RPM signal has a greater increase in engine RPM with respect to time prior to the gear shift compared to the actual RPM signal, wherein the simulated RPM signal decreases in RPM at a greater rate with respect to time after the gear shift compared to the actual RPM signal; and
    an engine sound enhancement ("ESE") module executable by the computer processing device, the ESE module for receiving the simulated RPM signal from the simulated RPM module and determining ESE tones based on the simulated RPM signal.

2. The control system as recited in claim 1, wherein the plurality of operating parameters further include a yaw rate and at least one of a vehicle speed, an engine speed rate of change, a vehicle acceleration, a transmission state, a fore/aft acceleration, a vehicle selected mode, a throttle pedal position, and a throttle pedal rate of change.

3. The control system as recited in claim 1, wherein the simulated RPM signal increases at a generally linear rate prior to the gear shift.

4. The control system as recited in claim 1, wherein the simulated RPM signal includes one of a generally convex profile, a generally concave profile, and an exponentially increasing profile prior to the gear shift.

5. The control system as recited in claim 1, wherein the ESE module is in communication with an amplifier, and wherein the amplifier is in communication with a transducer.

6. The control system as recited in claim 1, further comprising a powerful driving condition module, executable by the computer processing device, the powerful driving condition module configured to determine when the plurality of operating parameters indicate a powerful driving condition is taking place.

7. The control system as recited in claim 6, wherein a powerful simulated RPM signal is created by the simulated RPM module in response to the powerful driving condition being detected, and wherein the powerful simulated RPM signal increases at a greater rate prior to the gear shift compared to the simulated RPM signal.

8. The control system of claim 7, wherein the shift point determination module receives one of the simulated RPM signal indicating an RPM based on the signal generated by the shifting module or the powerful simulated RPM signal indicating another RPM based on a powerful shift signal generated by the powerful driving condition module.

9. The control system as recited in claim 1, further comprising a shift point determination module, executable by the computer processing device, the shift point determination module configured to receive as input the plurality of operating parameters and determine when the gear shift by the fixed gear transmission has actually occurred;
    wherein, subsequent to generating, by the shifting module, a shift signal indicating the gear shift is imminent, the shift point determination module determines from continuously monitored operating parameters that the gear shift is no longer imminent and has not occurred, the shift point determination modifies the simulated RPM signal.

10. The control system of claim 1, wherein the ESE tones emulate an increase in RPM at a greater rate prior to shifting when compared to the sound emitted from the engine.

11. A vehicle, comprising:
a fixed gear transmission configured to selectively perform a gear shift;
an engine that outputs an actual RPM signal;
a vehicle bus transmitting a signal indicating a plurality of operating parameters of the vehicle;
a computer processing device communicatively coupled to the vehicle bus;
a shifting module executable by the computer processing device, the shifting module receiving the signal from the vehicle bus and determining if the plurality of operating parameters of the vehicle indicate that the gear shift by the fixed gear transmission is imminent within a predetermined amount of time, the gear shift determined to be imminent within the predetermined amount of time as a function of the operating parameters, the operating parameters including a combination of an engine speed and an engine torque;
a simulated RPM module executable by the computer processing device, the simulated RPM module in communication with the shifting module generating a simulated RPM signal upon determining the gear shift is imminent, wherein the simulated RPM signal has a greater increase in engine RPM during a time interval prior to the gear shift compared to the actual RPM signal, wherein the simulated RPM signal decreases in RPM at a greater rate with respect to time after the gear shift compared to the actual RPM signal; and
an engine sound enhancement ("ESE") module executable by the computer processing device, the ESE module receiving the simulated RPM signal from the simulated RPM module and determining ESE tones based on the simulated RPM signal.

12. The vehicle as recited in claim 11, wherein the plurality of operating parameters further include a yaw rate and at least one of a vehicle speed, an engine speed rate of change, a vehicle acceleration, a transmission state, a fore/aft acceleration, a vehicle selected mode, a throttle pedal position, and a throttle pedal rate of change.

13. The vehicle as recited in claim 11, wherein the simulated RPM signal increases at a generally linear rate prior to the gear shift.

14. The vehicle as recited in claim 11, wherein the simulated RPM signal includes one of a generally convex profile, a generally concave profile, and an exponentially increasing profile prior to the gear shift.

15. The vehicle as recited in claim 11, wherein the ESE module is in communication with an amplifier, and wherein the amplifier is in communication with a transducer.

16. The vehicle as recited in claim 11, further comprising a powerful driving condition module executable by the computer processing device, the powerful driving condition module configured to determine when the plurality of operating parameters indicate a powerful driving condition is taking place.

17. The vehicle as recited in claim 16, wherein a powerful simulated RPM signal is created by the simulated RPM module in response to the powerful driving condition being detected, and wherein the powerful simulated RPM signal increases at a rate at a greater rate prior to the gear shift compared to the simulated RPM signal.

18. A vehicle, comprising:
a fixed gear transmission that is configured to selectively perform a gear shift;
an engine that outputs an actual RPM signal;
a vehicle bus transmitting a signal indicating a plurality of operating parameters of the vehicle, the plurality of operating parameters comprising a combination of an engine speed and an engine torque;
a computer processing device communicatively coupled to the vehicle bus;
a shifting module executable by the computer processing device, the shifting module receiving the signal from the vehicle bus and determining if the plurality of operating parameters of the vehicle indicate that the gear shift by the fixed gear transmission is imminent within a predetermined amount of time, the gear shift determined to be imminent within the predetermined amount of time as a function of the operating parameters, the operating parameters including a combination of an engine speed and an engine torque;
a simulated RPM module executable by the computer processing device, the simulated RPM module in communication with the shifting module for generating a simulated RPM signal upon determining the gear shift is imminent, wherein the simulated RPM signal has a greater increase in engine RPM with respect to time prior to the gear shift compared to the actual RPM signal, wherein the simulated RPM signal decreases in RPM at a greater rate with respect to time after the gear shift compared to the actual RPM signal; and
an engine sound enhancement ("ESE") module executable by the computer processing device, the ESE module receiving the simulated RPM signal from the simulated RPM module and determining ESE tones based on the simulated RPM signal.

* * * * *